United States Patent
Yoon et al.

(10) Patent No.: US 8,106,756 B2
(45) Date of Patent: Jan. 31, 2012

(54) ADAPTIVE INTERFACE PROVIDING APPARATUS AND METHOD

(75) Inventors: Daesub Yoon, Daejeon (KR); Soocheol Lee, Daejeon (KR); Ohcheon Kwon, Youngin-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 12/377,227

(22) PCT Filed: Jul. 25, 2007

(86) PCT No.: PCT/KR2007/003563
§ 371 (c)(1),
(2), (4) Date: Feb. 11, 2009

(87) PCT Pub. No.: WO2008/018699
PCT Pub. Date: Feb. 14, 2008

(65) Prior Publication Data
US 2010/0182141 A1 Jul. 22, 2010

(30) Foreign Application Priority Data
Aug. 11, 2006 (KR) ........................ 10-2006-0076362

(51) Int. Cl.
*B60Q 1/00* (2006.01)
(52) U.S. Cl. ............. 340/439; 340/576; 701/35; 701/45
(58) Field of Classification Search ................... 340/438, 340/439, 575, 576; 701/35, 45
See application file for complete search history.

(56) References Cited

U.S. PATENT DOCUMENTS
6,974,414 B2    12/2005  Victor
(Continued)

FOREIGN PATENT DOCUMENTS
JP              10-20985         1/1998
(Continued)

OTHER PUBLICATIONS

International Search Report (*International Application No. PCT/KR2007/003563; International Search Report Mailing Date: Oct. 15, 2007*).
Remboski D et al., "Driver Performance Improvement through the Driver Advocate: A Research Initiative toward Automotive Safety" Society of Automotive Engineers Publications, Nov. 1, 2000, pp. 1-10 *pp. 5-7*.

(Continued)

*Primary Examiner* — Brent Swarthout
(74) *Attorney, Agent, or Firm* — Staas & Halsey LLP

(57) ABSTRACT

An adaptive interface providing apparatus and method of setting an individual degree of attention for a specific driver based on an average degree of attention are provided. The adaptive interface providing apparatus includes a statistics database unit which analyze a predetermined statistical population, extracts a context feature including an average degree of attention required when a driving operation, a state of a car, or an external environment changes, a degree of attention required for interface manipulation when a driver manipulates interfaces of a car, and a similarity between the functions of the interfaces using at least one of a sensor, an RFID, and a GPS and stores and manages the context feature; an adjusting unit which senses a change in at least one of the driving operation, the state of a car, and the external environment using at least one of the sensor, the RFID, and the GPS and adjusts an individual degree of attention based on the extracted context feature and the average degree of attention according to the sensed change; and a safety determining unit which determines whether or not a sum of the individual degree of attention and the degree of attention required for interface manipulation when the driver manipulates the interfaces is larger than a predetermined threshold degree of safety attention required for safe driving.

2 Claims, 9 Drawing Sheets

U.S. PATENT DOCUMENTS

| | | | |
|---|---|---|---|
| 7,054,723 B2 * | 5/2006 | Seto et al. | 701/1 |
| 7,880,621 B2 * | 2/2011 | Kalik | 340/573.1 |
| 2004/0252027 A1 * | 12/2004 | Torkkola et al. | 340/576 |

FOREIGN PATENT DOCUMENTS

| | | |
|---|---|---|
| JP | 2003-211933 | 7/2003 |
| JP | 2004-110546 | 4/2004 |
| JP | 2004-294264 | 10/2004 |
| JP | 2004-301547 | 10/2004 |
| JP | 2005-326288 | 11/2005 |
| KR | 10-2003-0064765 | 8/2003 |
| KR | 10-2004-0073816 | 8/2004 |
| KR | 10-2005-0034862 | 4/2005 |
| WO | 02/30700 A2 | 4/2002 |
| WO | 02/33529 A2 | 4/2002 |

OTHER PUBLICATIONS

Piechulla Walter et al., "Reducing drivers' mental workload by means of an adaptive man-machine interface" vol. 6, Jan. 1, 2003, pp. 233-248.

IEEE Intelligent Systems IEEE, USA, vol. 16, No. 4, Jul. 1, 2001, pp. 78-81 *p. 79*.

Sarter et al, "Multimodal Information presentation: Design guidance and research challenges" International Journal of Industrial Ergonomics, Elsevier, vol. 36, No. 5, May 1, 2006, pp. 439-445.

European Search Report mailed Jul. 28, 2009 in corresponding European Patent Application 07768868.7.

* cited by examiner

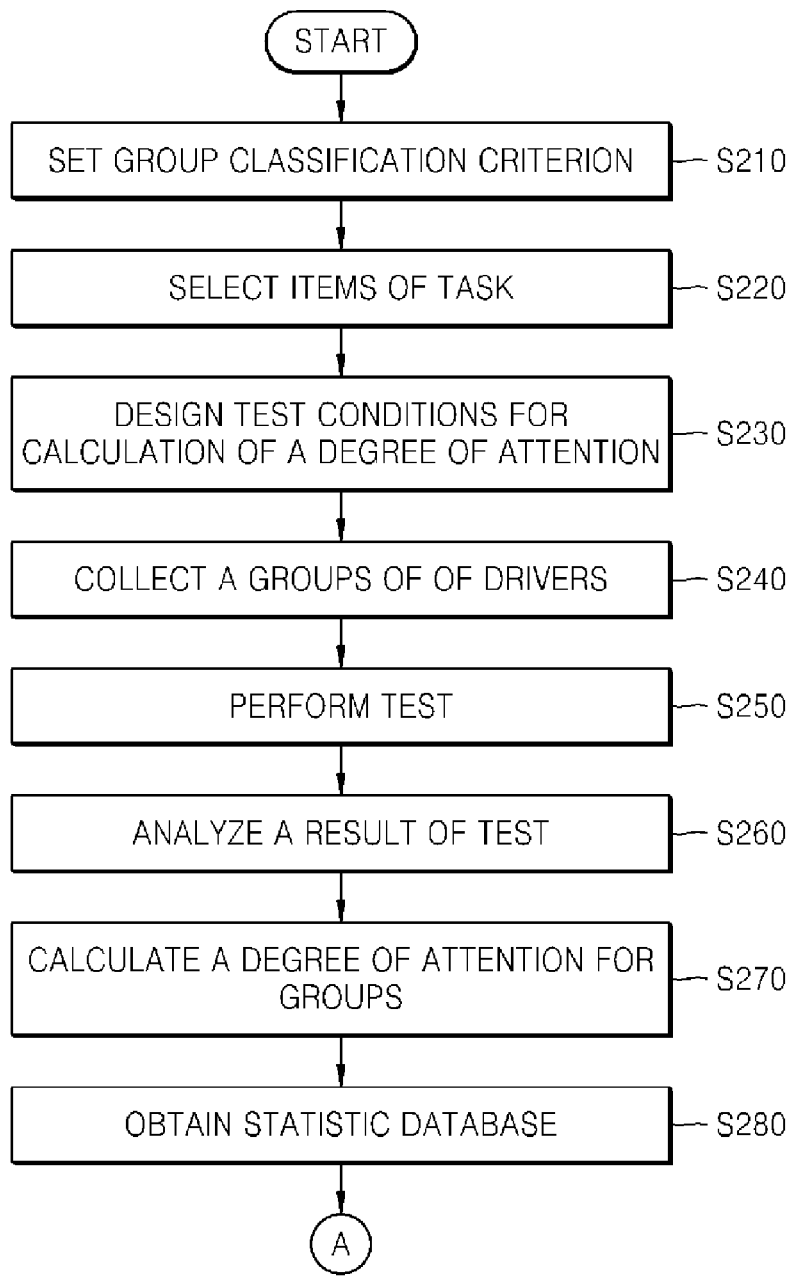
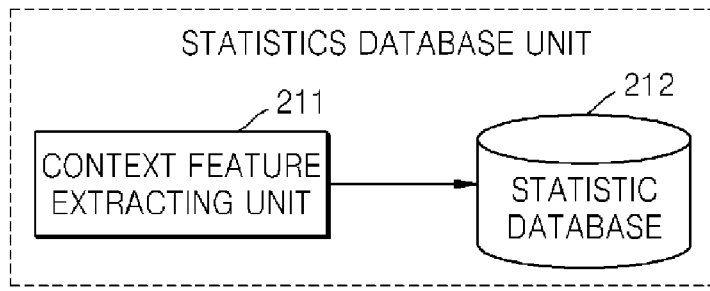

FIG. 3

| DRIVER CLASSIFICATION | MANIPULATION | STATE OF CAR | EXTERNAL ENVIRONMENT | DEGREE OF ATTENTION |
|---|---|---|---|---|
| MEN IN TWENTIES | MAKING A CALL | 40KM/H | SLIPPERY ROAD | 80% |
| MEN IN TWENTIES | RADIO MANIPULATION | 80KM/H | DRIZZLING RAIN | 70% |
| WOMEN IN TWENTIES | WIPER MANIPULATION | 60KM/H | HIGHWAY | 30% |

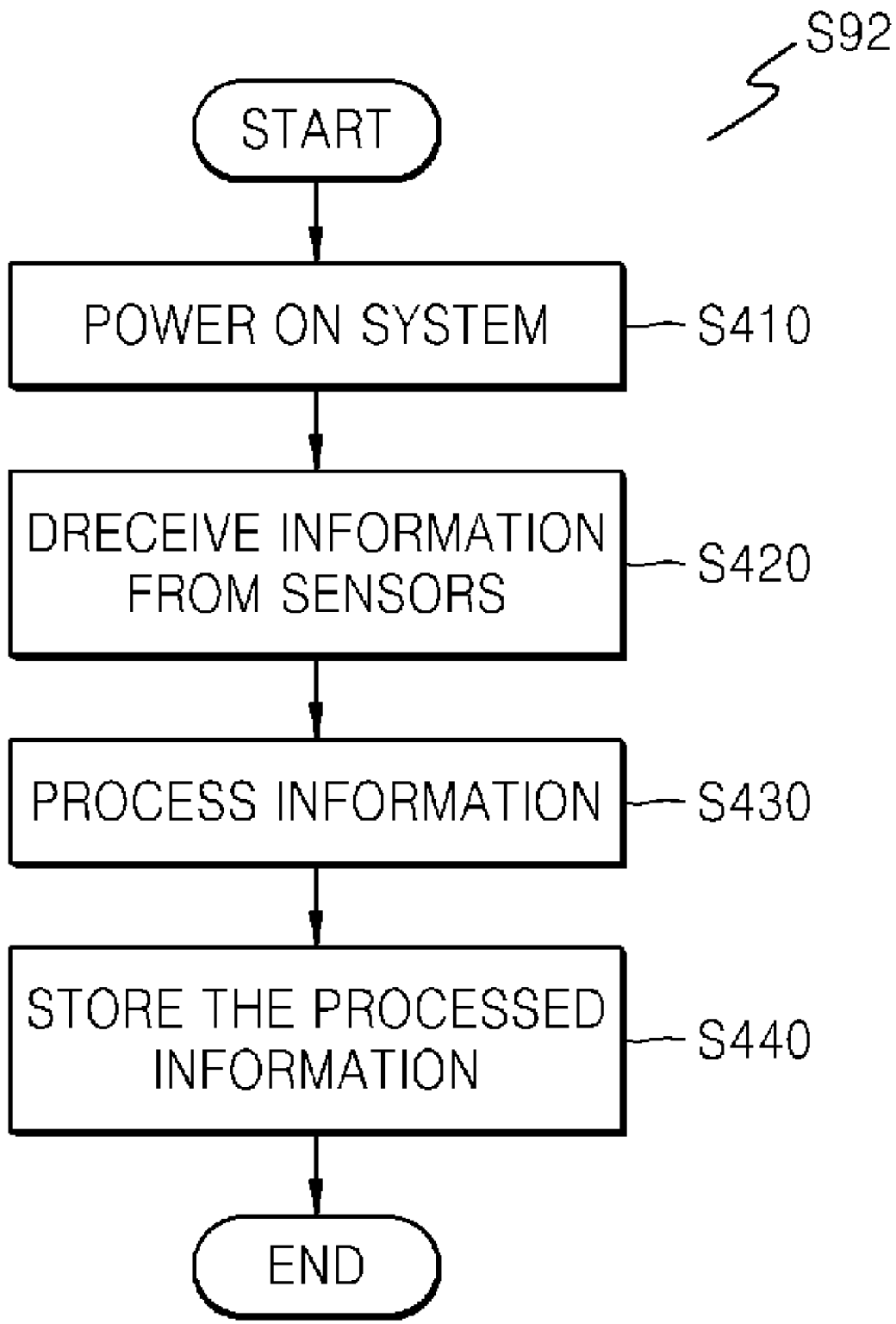

FIG. 5

| DRIVER — 510 | 520 | STATE OF CAR — 530 | EXTERNAL ENVIRONMENT — 540 | PERSONAL FEATURE — 550 | DEGREE OF ATTENTION — 560 |
|---|---|---|---|---|---|
| SPECIFIC DRIVER 1 | 수행 동작 / 주차 | POOR TIRE PRESSURE | CLEAR WEATHER | SUDDEN STARTING AND BRAKING | 80% |
| SPECIFIC DRIVER 2 | 선루프 조작 | 80KM/H | DRIVING IN TUNNEL | FREQUENT MANIPULATION OF APPARATUSES | 70% |
| SPECIFIC DRIVER 3 | 휴대폰 조작 | DRIVING ON A NATIONAL ROAD AT NIGHT | DRIVING ON A NATIONAL ROAD AT NIGHT | RECKLESS DRIVING | 30% |

ADAPTIVE INTERFACE PROVIDING APPARATUS AND METHOD

CROSS-REFERENCE TO RELATED PATENT APPLICATION

This application claims the benefit of Korean Patent Application No. 10-2006-0076362, filed on Aug. 11, 2006, in the Korean Intellectual Property Office, the disclosure of which is incorporated herein in its entirety by reference.

BACKGROUND OF THE INVENTION

1. Field of the Invention

The present invention relates to an adaptive interface providing apparatus and method for determining a degree of attention according to a driver's driving pattern and a driving environment and providing a suitable interface to the driver according to the degree of attention.

2. Description of the Related Art

In the field of telematics, techniques for selecting an interface in a car according to a degree of attention have been developed in order to provide driving safety and convenience which is designed based on a driving environment requiring a high degree of attention and a driver's characteristics.

Recently, various terminals have been commercially provided, and service providers have provided telematics services. In addition, users of telematics services have gradually increased. Therefore, various types of information services have been provided to drivers.

In conventional information services, accuracy and variety of information are considered to be important factors, but the convenience with which drivers can use the interface and the safety of drivers using the interface are not taken into consideration. Therefore, when the driver drives a car with a high degree of attention, the driver's manipulation of an information apparatus may cause an accident.

Therefore, adaptive interface providing techniques based on recognition of a driver's characteristics and environment have been developed. Unlike conventional information apparatus interface techniques, according to the adaptive interface providing techniques, various features such as driver's driving feature and drive environment are taken into consideration, so that the aforementioned information services can be easily utilized by persons that are not apt at using information apparatuses. In addition, it is possible to minimize a problem in that use of the information apparatus diverts the attention of a driver.

Most conventional techniques have been developed by a consortium of automobile companies and colleges in Europe and the USA. In addition, the techniques have also been developed to be suitable for the specific environments of the associated nations. Therefore, techniques cannot be easily applied to other nations.

Moreover, since most of the techniques are directed to general drivers, the techniques cannot be easily applied to various information apparatuses according to personal characteristics of specific drivers.

SUMMARY OF THE INVENTION

The present invention provides an apparatus and method capable of dynamically selecting an interface based on a driver's characteristics and an external environment and improving driving safety for the driver.

The present invention also provides an apparatus and method capable of selecting an interface suitable for a degree of attention and providing a diving safety and convenience to a driver.

According to an aspect of the present invention, there is provided an adaptive interface providing apparatus comprising: a statistics database unit which analyses a predetermined statistical population, extracts a context feature including an average degree of attention required when a driving operation, the state of a car, or an external environment changes, a degree of attention required for interface manipulation when a driver manipulates interfaces of a car, and a similarity between the functions of the interfaces using at least one of a sensor, an RFID, and a GPS, and stores and manages the context feature; an adjusting unit which senses a change in at least one of the driving operation, the state of the car, and the external environment using at least one of the sensor, the RFID, and the GPS and adjusts an individual degree of attention based on the extracted context feature and the average degree of attention according to the sensed change; and a safety determining unit which determines whether or not a sum of the individual degree of attention and the degree of attention required for interface manipulation when the driver manipulates the interfaces is larger than a predetermined threshold degree of safety attention required for safe driving.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B are views showing a data collecting process performed by a statistics database unit of the adaptive interface providing apparatus shown in FIG. 1, according to an embodiment of the present invention;

FIG. 3 is a view showing an example of the statistics database unit of the adaptive interface providing apparatus shown in FIG. 1, according to an embodiment of the present invention;

FIG. 4 is a view showing a data collecting method performed by a personal characteristic setting unit of the adaptive interface providing apparatus shown in FIG. 1, according to an embodiment of the present invention;

FIG. 5 is a view showing an example of the personal characteristic setting unit of the adaptive interface providing apparatus shown in FIG. 1, according to an embodiment of the present invention;

DETAILED DESCRIPTION OF THE INVENTION

Figure 1:
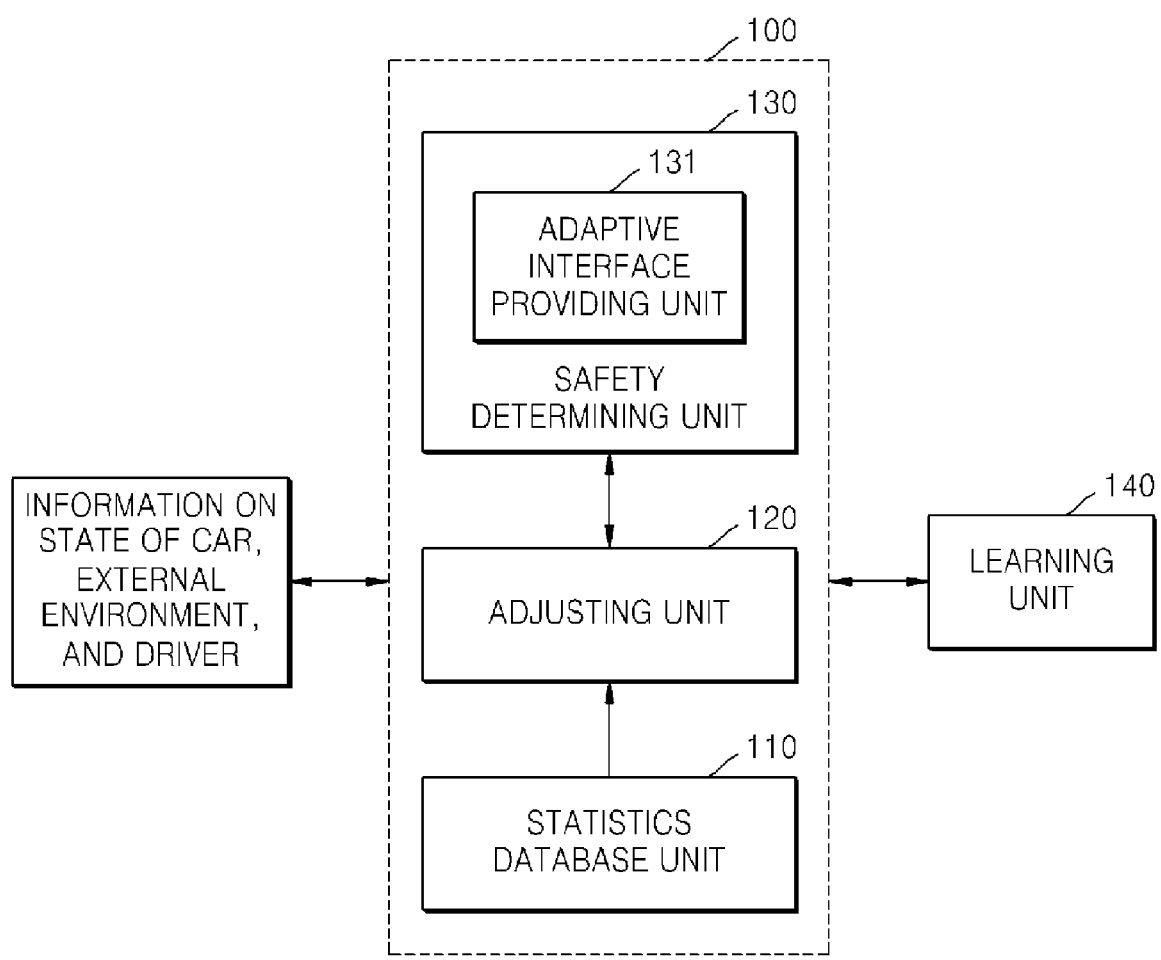
FIG. 1 is a view showing the construction of an adaptive interface providing apparatus according to an embodiment of the present invention.

Hereinafter, the present invention will be described in detail by explaining exemplary embodiments of the invention with reference to the attached drawings. Like reference numerals in the drawings denote like elements.

In order to clarify the sprit of the invention, descriptions of well known functions or constructions may be omitted.

FIG. 1 is a view showing the construction of an adaptive interface providing apparatus according to an embodiment of the present invention.

The adaptive interface providing apparatus 100 includes a statistics database unit 110, an adjusting unit 120, and a safety determining unit 130.

The statistics database unit 110 stores and manages information on an average degree of attention required when there is a change in at least one of a driving operation, the state of a car, and an external environment, on a degree of attention required for interface manipulation when a driver manipulates interfaces of a car, and on a similarity between the functions of the interfaces. The statistics database unit 110 is described in detail with reference to FIGS. 2A and 2B.

The state of the car includes speed, tire pressure, duration of use, and other information on the car. The external environment includes weather information such as temperature and humidity, the state of a road surface, the state of a road (for example, a curved road), and other factors which may externally influence driving of the car.

In order to obtain the average degree of attention, a number of drivers are firstly classified into driver groups according to a predetermined driver classification criterion such as gender, age, race, and physical features. The average degree of attention is an average value of degrees of attention required for individual drivers of a specific driver group when there is a change in conditions, i.e., a change in at least one of, for example, a driving operation, the state of a car, and an external environment.

The adjusting unit 120 searches for the driver group in which a specific driver is included and checks the average degree of attention required for the specific driver of the driver group using the statistics database unit 110. For example, the adjusting unit 120 may check the average degree of attention required for an age group in which the driver is included when the driver performs a specific operation.

A driving characteristic of river is stored. The driving feature is used to adjust an individual degree of attention. More specifically, the individual degree of attention is obtained by adjusting the average degree of attention according to a change in at least one of the driving operation, the state of the car, and the external environment with respect to each driver.

For example, it is checked how much degree of attention is statistically required for a group of men in their twenties, to which a twenty-seven-year-old man belongs when he performs a radio manipulation under the same or similar driving conditions (for example, at a speed of 40 km/h and on a slippery road). For example, the degree of attention may be 80.

When at least one of driving conditions such as the driving operation, the state of the car, and the external environment of the car which is driven by the twenty-seven year-old driver changes, the driving conditions are accumulatively stored and updated, and a degree of attention for the specific driver is selected based the average degree of attention under the stored and updated driving conditions. A detailed description thereof will be made with reference to FIGS. 4 to 6.

The safety determining unit 130 determines whether or not a sum of the individual degree of attention adjusted for the individual driver by the adjusting unit 120 and the degree of attention required for interface manipulation when the driver manipulates the interface is larger than a predetermined threshold of attention required for safe driving, hereinafter referred to as "safety attention".

When the sum of the individual degree of attention and the degree of attention required for interface manipulation is larger than the threshold degree of safety attention, an adaptive safety determining unit 131 searches for a new substitute for the interface based on the similarity and provides the new substitute for the interface to the driver.

If there is no substitute for the interface, the adaptive safety determining unit 131 issues an alert message to the driver.

FIGS. 2A and 2B are views showing a data collecting process performed by the statistics database unit 110 of the adaptive interface providing apparatus 100 according to the embodiment of the present invention.

In order to obtain a statistics database, a statistical population of drivers is collected and classified into groups according to a predetermined driver classification criterion (S210). The driver classification criterion may be age, gender, or the like.

Driving operations such as radio manipulation and wiper operation are selected (S220), and test conditions for calculation of a degree of attention are designed (S230). The test conditions may include a testing method, a to-be-tested, and a to-be-tested person.

After the design of the test condition, a suitable number of test drivers of the group are selected (S240). Next, a test for the degree of attention is carried out using an actual car to which sensors are attached or a simulator (S250).

As shown in FIG. 2B, a context feature extracting unit 211 extracts a context feature using an algorithm analyzing information (context) on a driver, a car, and an external environment obtained using the actual car to which sensors are attached or the simulator, and stores the context feature in a statistical database 212.

The result of the test is analyzed (S260), and the degree of attention for the group is calculated (S270). Next, the statistic database 212 is obtained (S280).

FIG. 3 is a view showing an example of the statistics database unit 110 of the adaptive interface providing apparatus 100 shown in FIG. 1, according to an embodiment of the present invention Driving operations may be classified into a primary task, that is, the driving operation, and a secondary task such as manipulation of an information apparatus and door manipulation.

With respect to the primary task, different degrees of attention are required according to the speed of a car, the state of a car, or an external environment. With respect to the secondary tasks, different degrees of attention are required for different interfaces.

In order to manage the degrees of attention, a number of drivers are collected and classified into driver groups according to a predetermined driver classification criterion such as gender, age, race, and physical feature.

Next, in order to obtain the degree of attention required for the secondary tasks, operations performed by a driver such as radio manipulation and wiper manipulation are selected, and text conditions for calculation of the degree of attention are designed. The test conditions may include a testing method, a to-be-tested item, and a to-be-tested person.

After the design of the test condition, a suitable number of to-tested drivers of the group are selected. Next, a test for the degree of attention is carried out using an actual car to which sensors are attached or a simulator.

Next, the context according to the driver, the state of the car, and the external environment obtained using an actual car to which sensors are attached or a simulator is analyzed to extract a context feature using a context analyzing algorithm. The result of analysis is stored in a database. The result of the test is analyzed to calculate a degree of attention for groups, and a human model database is obtained.

In FIG. 3, "Driver Classification" 310 denotes a common attribute of drivers in a group, for example, age and gender. "Manipulation" 320 denotes a manipulation which a driver included in the "Driver Classification" 310 performs. The "Manipulation" 320 may include a series of driver's manipulations such as making a telephone call, applying the brake pedal and window manipulation.

"State of Car" 330 denotes the state of a car when a driver included in a "Driver Classification" 310 performs a manipulation included in "Manipulation" 320. The "State of Car" 330 may include a car's speed, tire pressure, accumulated date of use, or other information on a car.

"External Environment" 340 denotes an external environment of a car when a driver included in "Driver Classification" 310 performs a manipulation included in "Manipulation" 320. The "External Environment" 430 may include weather information such as temperature and humidity and road information such as the state of a surface of a road and the shape of the road (for example, a curved road), or other information on external conditions which may affect driving of the car.

"Degree of Attention" 350 is a value obtained by statistically analyzing data based on information collected according to the items of "Driver Classification" 310, "Manipulation" 320, "State of Car" 330, and "External Environment" 340.

As an example, the degree of attention of a specific driver may be analyzed according to the speed of the car. Namely, when the driver does not drive the car, the degree of attention is determined to be 0%. When the driver drives the car at a speed of 100 km/h, the degree of attention is determined to be 100%. When the driver drives the car at a speed of 50 km/h, the degree of attention is determined to be 50%.

As another example, the degree of attention of a specific driver may be analyzed with respect to window manipulation. When the degree of attention required for opening the widow during driving is set to be about 20%, the degree of attention required for tuning the radio is determined to be a value higher than 20%. In this manner, the average degrees of attention for drivers in each group are analyzed and stored.

FIG. 4 is a view showing a data collecting method performed by a personal characteristic setting unit 120 of the adaptive interface providing apparatus 100 shown in FIG. 1, according to the embodiment of the present invention When an adaptive interface providing apparatus 100 is powered on (S410), a personal characteristic setting unit 120 receives identification information of a driver and checks an average degree of attention for a group to which the driver belongs by referring to the statistics database unit 110. Next, information (context) on the driver, the state of a car, and an external environment is collected using sensors, an RFID, or GPS (S420).

When at least one driving condition such as the driving operation, the state of the car, and the external environment changes, the driving conditions are accumulatively stored and updated, and a degree of attention for the specific driver is selected based the average degree of attention under the stored and updated driving conditions.

The collected context is processed in such a format that the context can be used for the adaptive interface providing apparatus 100 (S430). The context is stored in a database (S440). The collecting and processing of the context feature are well known to persons having ordinary skill in the related art.

FIG. 5 is a view showing an example of the personal characteristic setting unit 120 of the adaptive interface providing apparatus 100 shown in FIG. 1, according to an embodiment of the present invention.

Unlike "Driver Classification" 310 shown in FIG. 3, "Driver" 510 denotes a specific driver. "Manipulation" 520 denotes a manipulation which the specific driver included in the "Driver" 510 performs. "State of Car" 530 denotes the state of a car when the specific driver included in "Driver" 510 performs a manipulation included in "Manipulation" 520.

"External Environment" 540 denotes an external environment of a car when the specific driver included in "Driver" 510 performs a manipulation included in "Manipulation" 520. "Personal Feature" 550 denotes features of the specific driver. The "Personal Feature" 550 may include a driving feature of the specific driver, a physical handicap of the specific driver, or the like.

"Degree of Attention" 550 is a value obtained by statistically analyzing data based on information collected according to the items of "Driver" 510, "Manipulation" 520, "State of Car" 530, "External Environment" 540, and "Personal Feature" 550.

Figure 6:
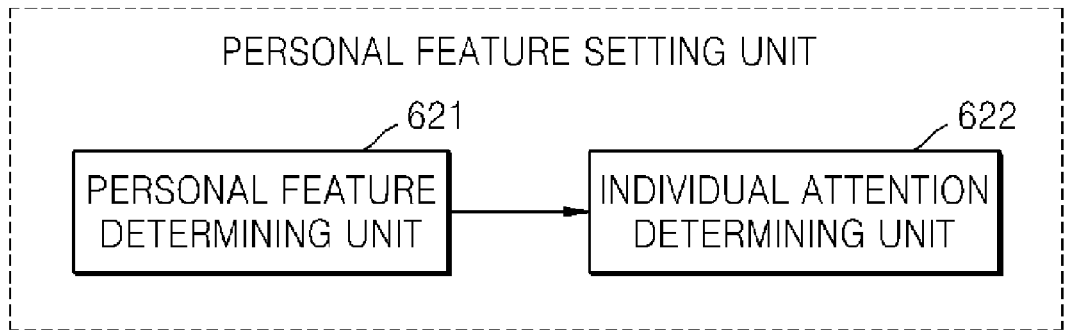
FIG. 6 is a view showing the construction of a unit which determines a degree of attention suitable for a personal characteristic, according to an embodiment of the present invention.

FIG. 6 is a view showing the construction of a unit which determines a degree of attention suitable for a personal feature, according to the embodiment of the present invention The personal feature setting unit 120 includes a personal feature determining unit 621 which determines personal features of a specific driver under a condition that different degrees of attention of the specific driver are stored according to different states of a car and different external environments and an individual attention determining unit 622 which determines an individual degree of attention evaluated based on the personal features of the specific driver.

More specifically, personal features denote information such as a driving pattern. In a group of men in their thirties, some men who are experienced at using computers may be more apt at using to an information apparatus than other men who have no experience. By taking the personal features into consideration, an individual degree of attention suitable for the specific driver can be obtained from the degree of attention stored in the statistics database unit 110.

Referring to the statistic database of FIG. 3, when a man in twenties drives a car at a speed of 40 km/h on a slippery road, a degree of attention for a "making a call" manipulation is set to 80%. If a specific driver is a man in his thirties, a degree of attention is statically allocated to the specific driver based on the index of the statistic database.

The personal feature setting unit 120 records data indicating that the specific driver drove the car on such a slippery road at a speed of 40 km/h while making a call. If the specific driver drives the car under the same condition safely ten times, the specific driver is determined to be used to the driving condition, so that a degree of attention statistic of 80% is set to 75% which is suitable for the specific driver. In this manner, the individual degrees of attention suitable for the individual drivers are selected by analyzing the accumulated driving patterns of individual drivers.

Figure 7:
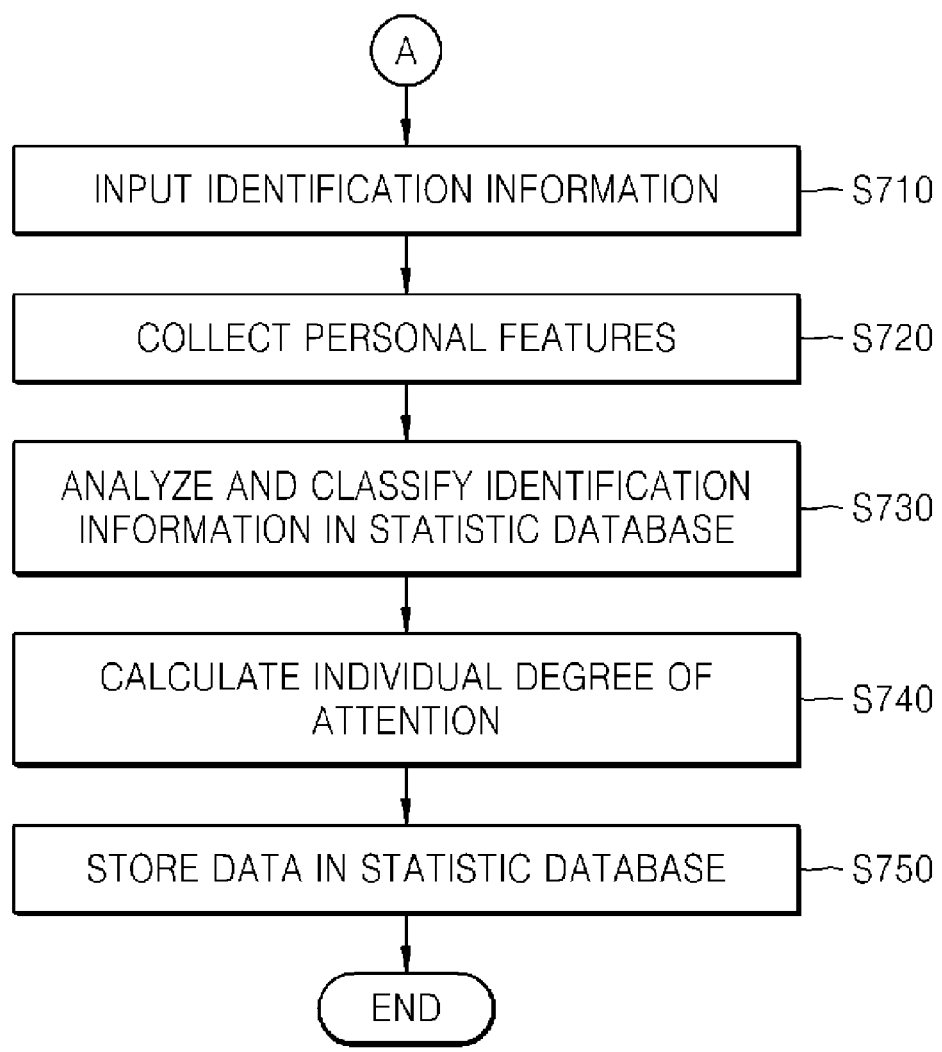
FIG. 7 is a view showing a data collecting process performed by the personal characteristic setting unit of the adaptive interface providing apparatus shown in FIG. 1, according to an embodiment of the present invention.

FIG. 7 is a view showing a data collecting process performed by the personal feature setting unit 120 of the adaptive interface providing apparatus 100 shown in FIG. 1, according to an embodiment of the present invention The personal feature setting unit 120 receives identification information of a driver from the statistics database shown in FIG. 2A (S710). When at least one of a plurality of driving conditions such as the driving operation, the state of the car, and the external environment changes, driving conditions are accumulatively stored and updated, and driving features of the specific driver (for example, sudden braking and reckless driving) are collected (S720).

Next, a degree of attention statistic of a group to which the driver belongs is determined using the statistics database unit 110, and a degree of attention suitable for a personal characteristic of an individual driver is determined based on the degree of attention statistic and stored (S730 to S750).

Figure 8:
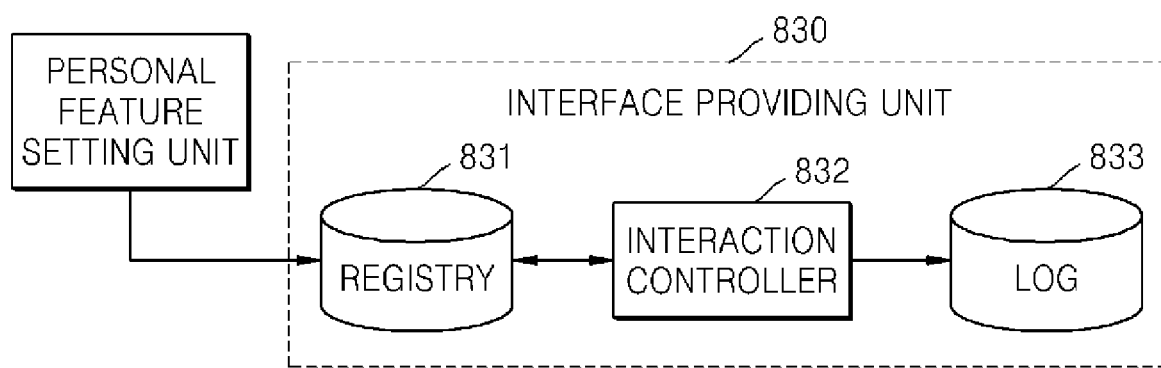
FIG. 8 is a view showing a module which provides an interface suitable for a driver's situation, according to an embodiment of the present invention.

FIG. 8 is a view showing a module which provides an interface suitable for a driver's situation, according to an embodiment of the present invention.

The safety determining unit 830 includes a registry 831 which stores and manages information on the interfaces of the car, a degree of attention for manipulation of the interfaces, and a similarity between functions of the interfaces.

As described above, the registry 831 stores and manages a degree of attention for manipulation of the interfaces. For example, a degree of attention for operation of a radio component may be set to "20", and a degree of attention for manipulation of a mobile phone may be set to "40".

In addition, the registry 831 stores and manages information on similarity between the functions of the interfaces.

For example, when a degree of attention to a text e-mail function is 20, a degree of attention to a voice mail application as an example of a similar function may be checked to be 15.

In addition, using a log-on database 833 which stores information of an individual driver who logs on interfaces or application, it can be determined how frequently the driver uses a specific interface or application.

An interaction controller 832 substantially activates an interface suitable for the driver based on the degree of attention and the interface-function similarity managed by a registry 831.

Figure 9:
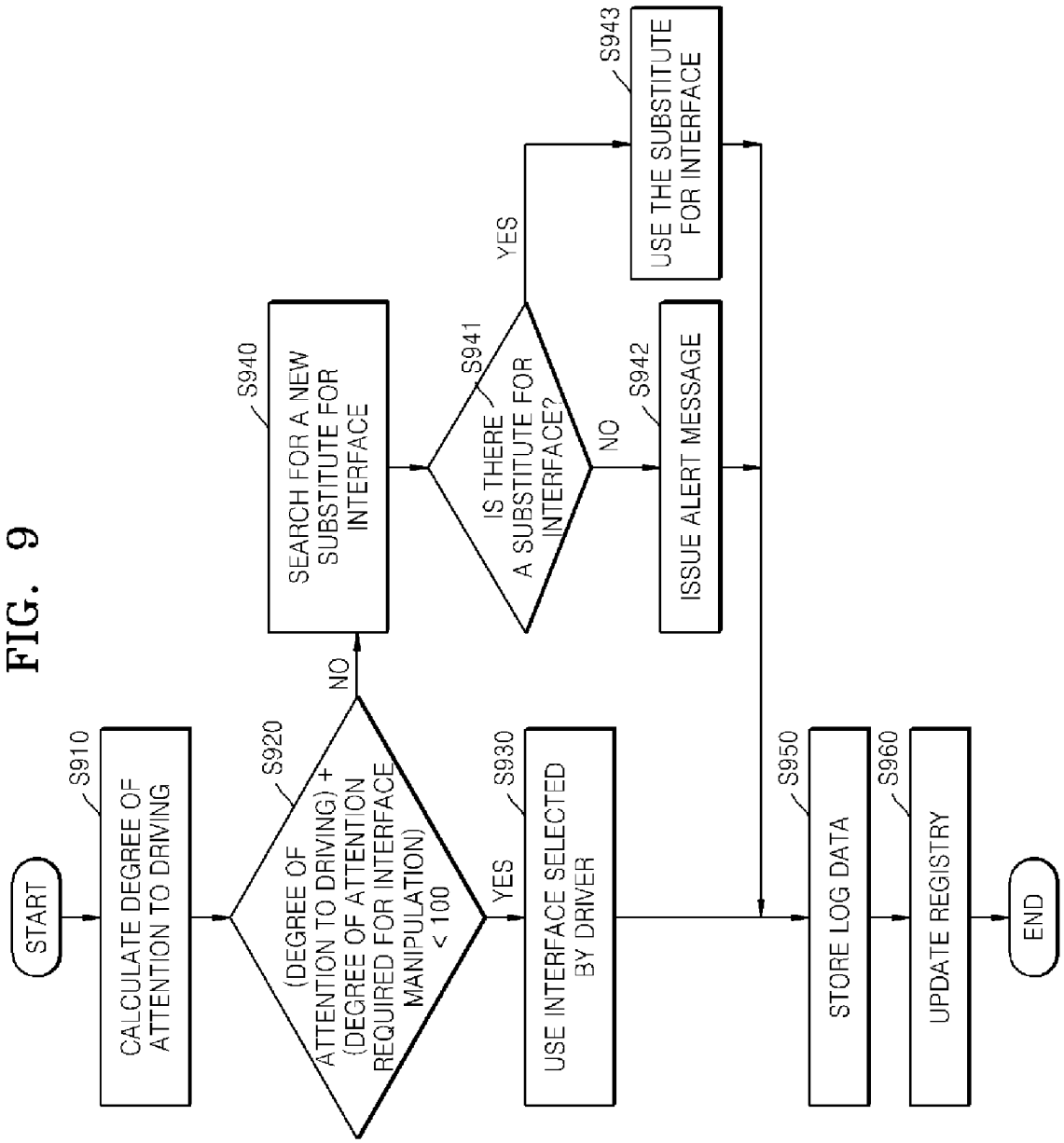
FIG. 9 is a flowchart showing a method of providing an interface suitable for a driver's situation, according to another embodiment of the present invention.

FIG. 9 is a flowchart showing a method of providing an interface suitable for a driver's situation, according to another embodiment of the present invention A safety determining unit 130 calculates a degree of attention to driving using a statistics database unit 110 (S910). A personal feature setting unit 120 determines whether or not a sum of the individual degree of attention and the degree of attention required for interface manipulation when the driver manipulates the selected interface is larger than a predetermined threshold value (for example, 100) (S920).

When the sum of the individual degree of attention and the degree of attention required for interface manipulation is not larger than the threshold value (for example, 100), the driver is allowed to use the selected interface and application (S930).

When the sum of the individual degree of attention and the degree of attention required for interface manipulation is larger than the threshold value (for example, 100), a new substitute for the interface is searched for based on degrees of attention of interfaces and the similarity between interfaces stored in the statistics database unit and the registry (S940).

If there is a substitute for the interface, the safety determining unit 130 provides the substitute for the interface to the driver (S943). If not, an alert message is issued to the driver (S942).

Next, information on the selected interface and the substitute for the interface and log-on data of the alert message is used to update the registry of the safety determining unit 130 (S960). When the storing and updating processes are performed in operations S950 and S960, a learning unit 140 learns the registry which is dynamically requested for the conditions of the individual drivers.

An example of the flowchart shown in FIG. 9 is as follows. A degree of attention required for a driving operation of the driver may be 80, and a degree of attention required for a text e-mail application selected by the driver may be 30. The sum of the degree of attention required for a driving operation and the degree of attention required for the text e-mail application may be larger than a threshold value (for example, 100). In this case, a new substitute for the interface is searched for.

Among similar interfaces stored in the registry of the safety determining unit 130, a voice e-mail application which is determined to have a degree of attention (for example, 15) smaller than that of the text e-mail application is searched for. Since the sum of the degree of attention (80) required for the driving operation and the degree of attention (15) required for the voice e-mail application is not larger than the threshold value (f100), the voice e-mail application can be selected as a substitute for the interface.

The state of the car and external environment of the driver who uses the voice e-mail application are stored and updated in the registry.

Figure 10:
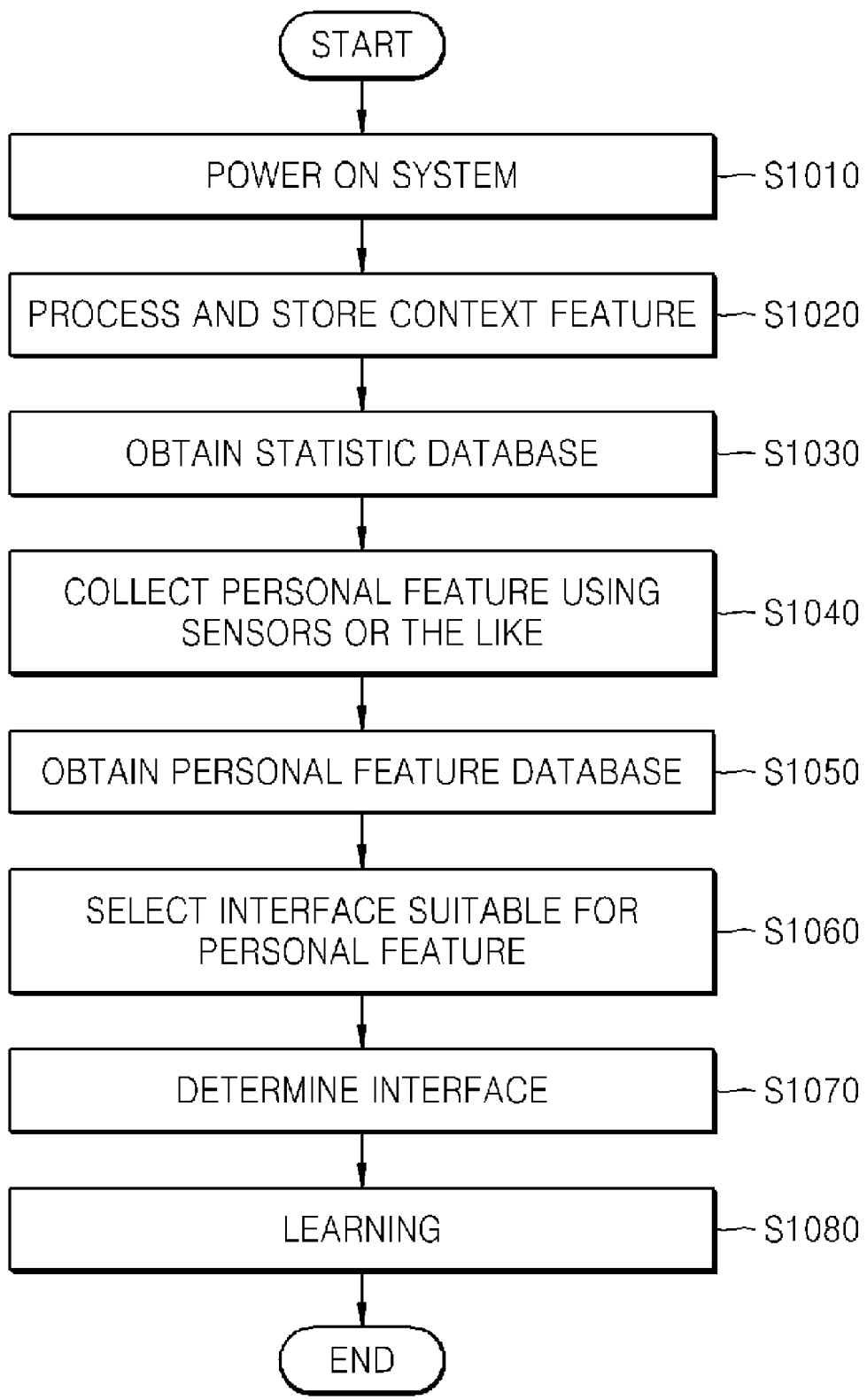
FIG. 10 is a flowchart showing an adaptive interface providing method according to another embodiment of the present invention.

FIG. 10 is a flowchart showing an adaptive interface providing method according to another embodiment of the present invention.

A group classification criterion is set. A degree of attention required when a driving operation, the state of a car, or an external environment changes is obtained from a predetermined statistical population of drivers under predetermined test conditions as a context feature (S1010 and S1020). The degree of attention is stored in a statistics database unit (S1030).

Next, a driving characteristic of a specific driver is determined, and the state of the car and the external environment of a specific car are determined using a sensor, an RFID, and a GPS attached to the car so as to adaptively provide an interface to the driver (S1040).

The statistics database unit checks an index of the specific driver. A reference degree of attention is selected based on a database of the statistics database unit. Next, a degree of attention of the specific driver is determined based on the driver's characteristics, the state of the car, and the external environment obtained in operation S1040 (S1050).

Subsequently, it is determined whether or not the degree of attention of the specific driver is larger than a threshold degree of attention required when the driver selects an interface in terms of driving safety. If the degree of attention is not larger than the threshold degree of attention, the interface is provided to the driver. If the degree of attention is larger than the threshold degree of attention, a new substitute for the interface may be provided to the driver, or an alert message may be issued to the driver.

When the interface is determined (S1070), information of interface selection (log-on) according to a driver's characteristics, a state of a car, and an external environment is accumulatively stored and updated, so that a learning process for the interface selection is performed (S1080).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

According to the present invention, an adaptive telematics human interface technique is provided, and a personalized telematics driver interface technique capable of providing a driving safety and convenience using a human model based on a driving environment and personal features is provided. In addition, by using the personalized telematics interface technique, it is possible to improve a telematics service quality.

According to the present invention, it is possible to implement a modeling technique obtained from an analysis of driver's characteristics, states of a car, and external environment and to implement domestic and international standards. In addition, by applying the modeling technique to fields of interaction between human and computers, it is possible to provide various convergence services.

According to the present invention, an adaptive telematics human interface technique provides an environment where persons who are not apt at using an information apparatus can easily use various telematics services. Accordingly, it is possible to alleviate the problem of "digital divide" and to develop a new convergence technique between information apparatuses.

According to the present invention, it is possible to actively promote a telematics service market, to ensure driving safety, and to develop a new high-valued convergence industry of an information technique and an automobile industry.

What is claimed is:

1. An adaptive interface providing apparatus comprising:
   a statistics database unit which analyzes a predetermined statistical population, extracts a context feature including driving operations, an average degree of attention required when a driving operation, a state of a car, external environment changes, a degree of attention required for interface manipulation when a driver manipulates interfaces of a car, and a similarity between the functions of the interfaces using at least one of a sensor, an RFID, and a GPS, and stores and manages the context feature;
   an adjusting unit which senses a change in at least one of the driving operation, the state of the car, and the external environment using at least one of the sensor, the RFID, and the GPS and adjusts an individual degree of attention based on the extracted context feature and the average degree of attention according to the sensed change;
   a safety determining unit which determines whether or not a sum of the individual degree of attention and the degree of attention required for interface manipulation when the driver manipulates the interfaces is larger than a predetermined threshold degree of safety attention required for safe driving; and
   an adaptive safety determining unit,
   wherein, when the sum of the individual degree of attention and the degree of attention required for interface manipulation is larger than the threshold degree of safety attention, the adaptive safety determining unit searches for a new substitute for the interface based on the similarity and provides the new substitute for the interface to the driver, and
   wherein, if there is no substitute for the interface, the adaptive safety determining unit issues an alert message to the driver.

2. An adaptive driving supporting method comprising:
   (a) analyzing a predetermined statistical population, extracting a context feature including driving operations, an average degree of attention required when a driving operation, a state of a car, or an external environment changes, a degree of attention required for interface manipulation when a driver manipulates interfaces of a car, and a similarity between the functions of the interfaces using at least one of a sensor, an RFID, and a GPS, and storing and managing the context feature;
   (b) sensing a change in at least one of the driving operation, the state of the car, and the external environment using at least one of the sensor, the RFID, and the GPS;
   (c) adjusting an individual degree of attention based on the extracted context feature and the average degree of attention according to the sensed change;
   (d) determining whether or not a sum of the individual degree of attention and the degree of attention required for interface manipulation when the driver manipulates the interfaces is larger than a predetermined threshold degree of safety attention required for safe driving;
   (e1) when the sum of the individual degree of attention and the degree of attention required for interface manipulation is larger than the threshold degree of safety attention, searching for a new substitute for the interface based on the similarity and providing the new substitute for the interface to the driver; and
   (e2) if there is no substitute for the interface, issuing an alert message to the driver.

* * * * *